Dec. 26, 1961  F. A. KROHM  3,014,232
APPARATUS FOR WIPING A CURVED WINDSHIELD
Filed Jan. 17, 1955  2 Sheets-Sheet 1
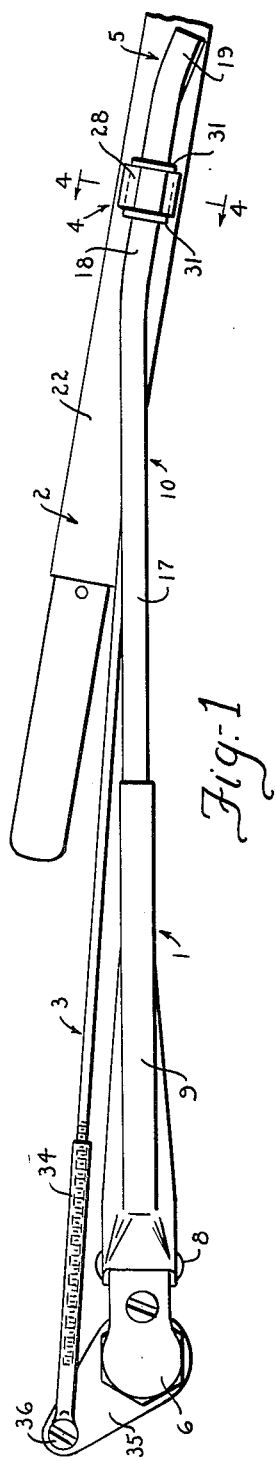
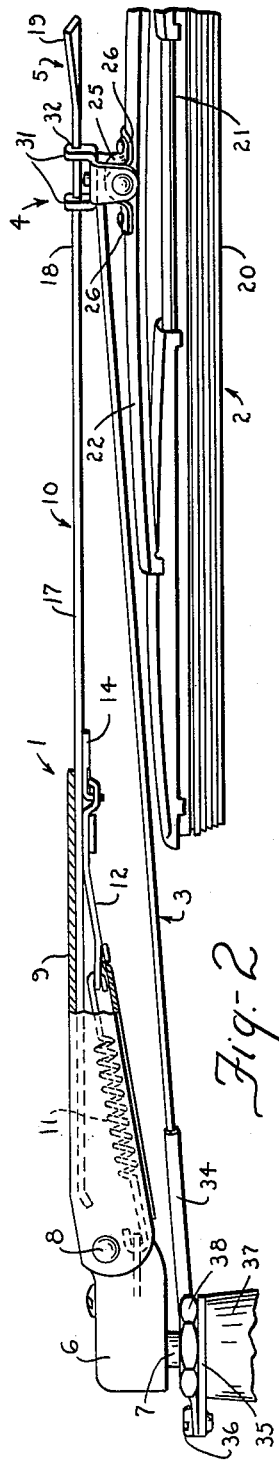
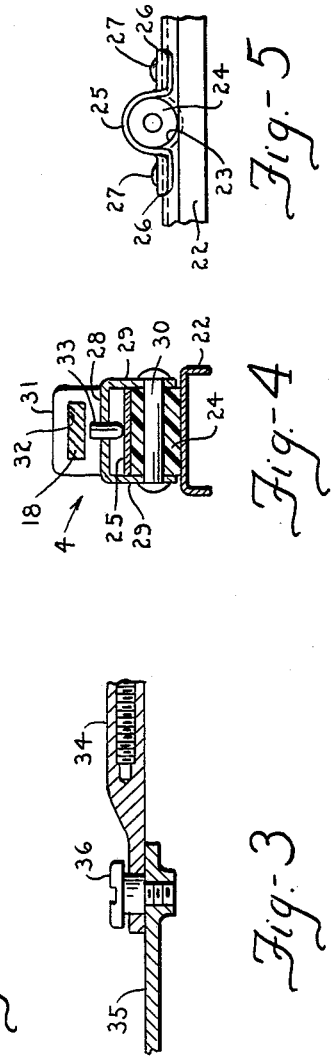
INVENTOR.
FRED A. KROHM
BY Charles S. Penfold
ATTORNEY

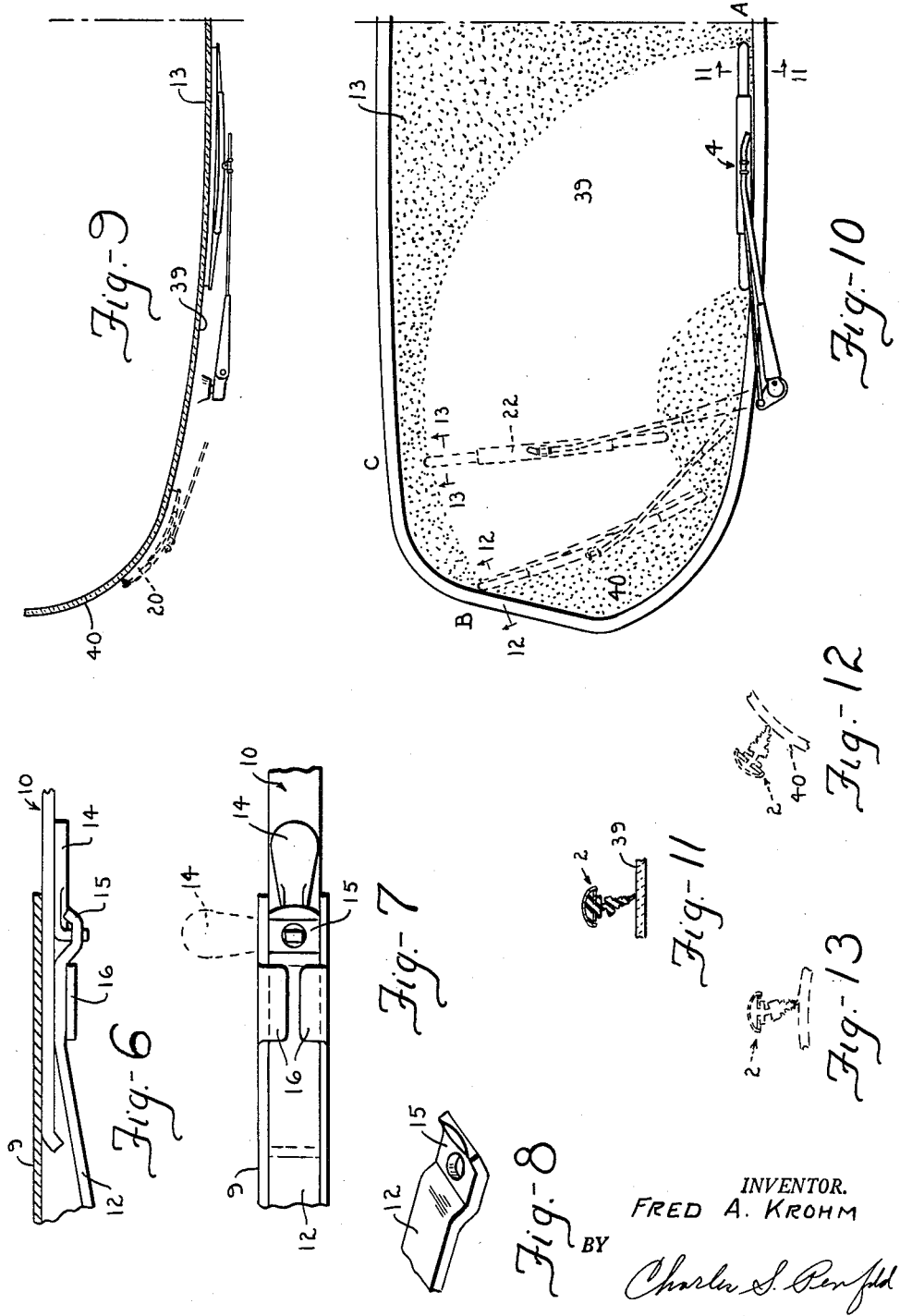

3,014,232
APPARATUS FOR WIPING A CURVED WINDSHIELD
Fred A. Krohm, Hobart, Ind., assignor to The Anderson Company, a corporation of Indiana
Filed Jan. 17, 1955, Ser. No. 482,278
12 Claims. (Cl. 15—250.23)

This invention relates generally to windshield wiper devices and more particularly is directed to a wiper arm unit and/or combination of this unit with a wiper blade unit and a movement-modifying member for wiping a curved surface.

The windshields of automotive vehicles are being made wider and longer and with curved rearwardly extending extremities or wings to promote vision and styling. In the trade, windshields of this character are referred to as the wrap-around type.

The design of windshield structures now provided on some vehicles has advanced to an extent where conventional wipers are incapable of satisfactorily cleaning certain areas of a windshield, particularly at or adjacent the curved wings. Some areas due to the increased width and extreme curvature of the glass are not wiped at all by a conventional wiper. In fact a conventional wiper blade operating through a true arc in approaching a wing will leave the windshield so that a portion of the blade will extend into space and/or beyond the edges of the windshield in which event only a small part of the wing is cleaned. This condition results in poor visibility and therefore is detrimental to safe driving.

With the foregoing in mind, one of the principal objects of the invention is to provide a wiper apparatus comprising a wiper blade carrying arm unit with means for reciprocating, pivoting and tilting the blade unit with respect to the longitudinal axis of the arm so that the blade will be cause to readily conform to and wipe a particular portion or areas of the windshield.

More specifically, the arrangement, for example, is such that the blade during a complete stroke in one direction from a parked position will progressively move away from the drive shaft supporting the wiper arm and as the blade approaches and travels across the wing portion of the windshield it will be progressively pivoted relative to the arm and tilted on its longitudinal axis so as to reach and wipe a prescribed higher side area of the windshield which could not be wiped by a blade restricted for movement in a true arc by conventional apparatus. In other words, the invention offers a means whereby the blade will be held erect in normal and conforming relationship to a particular surface to be cleaned and this is preferably accomplished by pivoting and tilting the blade as it reciprocates while traveling on said surface or area. These movements or motions imparted to the blade are in addition to the conventional pivotal movement of the blade in a plane transverse to its longitudinal axis.

More particularly, an object of the invention is to provide a novel apparatus comprising, among other things, a primary arm unit having an inner section for attachment to a drive shaft, an outer section pivotally connected to the inner section, a wiper blade unit, novel connection means operatively connecting these units, novel means on the wiper arm unit adapted to cooperate with the connection means, a secondary or movement-modifying member or arm having one end pivoted to the connection means and its other end arranged for attachment to a support adjacent the drive shaft so that when the primary arm is oscillated across a windshield by the drive shaft the blade carried thereby will be caused to reciprocate lengthwise of the primary arm and when the novel means on the arm engages and coacts with the connection means the blade will pivot and tilt while moving along the arm. The arrangement is preferably such that the tiltable and pivotal motions of the blades takes place only when the novel means on the arm engages the connection means to produce the motion or motions desired so that the blade will wipe the windshield at or adjacent its wing portion which could not be reached except for such motion transmitted to the blade. It is to be understood that the arm, the novel means thereon and the connection means can be designed and constructed to vary the pivotal and tiltable motions. For example, provision may be made to impart a pivotal movement to the blade prior to or subsequent to the tiltable movement and, if found desirable, an arrangement may be made to produce one or both of such movements at any location within the oscillating range of the wiper arm in order that the apparatus embodying the invention can be utilized to wipe windshields of different contours or shapes.

Another object of this invention is to vary the lateral angular relationship between the longitudinal axes of the arm and the blade, in infinite progression, and in such manner as will dispose the blade under all conditions, with relation to the glass, advantageously for desirable termination of the wiping pattern at each end of the stroke of the blade.

A further object of the invention is to provide wiper apparatus whereby extraneous and objectionable material may be removed from a windshield with a minimum of danger of scratching the glass because of any contact therewith by abrasive portions of the apparatus employed during the wiping action.

Additional attributes of the invention reside in its durability, efficiency in operation, and low cost of manufacture as compared to other apparatus for cleaning wrap-around windshields.

Other objects and advantages of the invention will become apparent after the description hereinafter set forth is considered in connection with the drawings annexed hereto.

In the drawings:

FIGURE 1 is a front view of the primary and secondary arm structure and the invention embodied therein;

FIGURE 2 is a side view of the structure in FIGURE 1 as applied to a shaft, with portions in section to show details of the construction;

FIGURE 3 is a partial view of a connection employed to connect the secondary arm or member to a fitting located adjacent the shaft;

FIGURE 4 is an enlarged sectional view taken substantially on line 4—4 of FIGURE 1 to illustrate the connection means employed to operatively connect the primary arm, movement-modifying member and the blade;

FIGURE 5 is a partial view showing the manner in which the connection means is attached to the blade unit;

FIGURE 6 is an enlarged partial side view of the clamping means used to adjust the length of the primary arm unit;

FIGURE 7 is a bottom view of the structure illustrated in FIGURE 6;

FIGURE 8 is a partial perspective of one of the components of the clamping means;

FIGURE 9 is a partial longitudinal sectional view taken through a windshield showing different positions of the wiper apparatus;

FIGURE 10 is a front view of the windshield showing different positions of the wiper apparatus;

FIGURE 11 is a transverse section taken substantially on line 11—11 of the blade in FIGURE 10 exemplifying the position of the blade at location A on the frontal portion of the windshield;

FIGURE 12 is a transverse section taken substantially on line 12—12 of the blade in FIGURE 10 illustrating the position of the blade at location B on the wing portion of the windshield; and FIGURE 13 is a transverse section taken substantially on line 13—13 of the blade in FIGURE 10 showing the position of the blade at an intermediate location C.

Referring particularly to FIGURES 1 and 2 of the drawings, numeral 1 generally designates a wiper arm assembly or unit, 2 a blade unit, 3 a movement-modifying member or arm, 4 connection means operatively connecting the units and modifying member and 5 novel means preferably provided on the arm unit for coaction or cooperation with the connection means in a manner whereby to obtain the tilting or pivotal and tiltable motions above referred to.

The wiper arm unit 1 includes an inner section 6 for attachment with a drive shaft 7 as shown in FIGURE 2, and an outer section pivotally connected at 8 to the inner section. The outer section preferably includes a channel 9 which slidably supports a bar-like member generally designated 10 which carries the blade unit. A helical spring 11 has its ends respectively connected to the inner section 6 and a fitting 12 on the arm for urging the outer arm section toward a windshield 13 shown in FIGURES 9 and 10 of the drawing. The inner extremity of the arm member 10 is disposed between the bottom wall of the channel 9 and the fitting 12, and a lever 14 is pivotally connected to a yieldable offset 15 on the fitting for clamping the member 10 in any extended position desired. When the lever is manipulated to a lateral position transverse to the longitudinal axis of the arm as indicated by the dotted lines in FIGURE 7 the bar member 10 can be readily adjusted and when the lever is aligned with the axis the bar is locked in place. It will be noted that the bar and fitting are both arranged in the channel between its bottom wall and a pair of abutments 16 carried by the side walls of the channel.

The extensible bar member 10 includes an inner straight portion or part 17, an intermediate straight portion or part 18, and an outer extremity provided with the novel means 5 above referred to. The intermediate portion 18 is preferably disposed in the same plane as the inner portion 17 but at an angle with reference to the inner portion as shown in FIGURE 1. The novel means provided on the outer extremity of the bar preferably comprises a straight portion or part 19 which is preferably offset or disposed at an angle with reference to the longitudinal axis of the intermediate portion 18 and also in an inclined plane with reference to the general plane of the bar to form what can be termed a cam. The manner in which this novel means cooperates with the connection means will be described more in detail subsequently.

The wiper blade unit 2 preferably includes a resilient wiper element 20, a resiliently flexible support 21 for the element, a pressure-distributing device having a pair of yokes having their ends connected to the support, a bridge 22 having its ends connected to the yokes, and the connection 4 is carried by the bridge. This blade is of a character for wiping flat and/or curved windshields.

One way of attaching the connector or connection means 4 to the bridge will now be described. The bridge as shown in FIGURE 5 is preferably indented to provide a generally cylindrical seat 23 extending transverse to the length of the bridge. A tubular bearing 24, preferably of a plastic such as nylon, is secured in this seat by a strap 25 having a curved portion engaging the bearing and offset ends 26 engaging the upper side of the bridge with rivets 27 extending through the ends and bridge to firmly secure the strap and bearing to the body.

The connection means 4 may be designed and constructed in various ways but as herein exemplified includes a base wall 28 provided with a pair of corresponding depending legs 29 which straddle the strap and nylon bearing. A cross pin 30 extends through the legs 29 and bearing and its ends are upset to lock the connection means to the blade unit to permit the blade unit to pivot about the axis of the pin. The base wall 28 is also provided with a pair of corresponding uprights 31 having aligned generally rectangular guide openings 32 therein which slidably receive the wiper arm bar 10 as clearly shown. The fit of the bar in the openings 32 and the spacing between the uprights 31 are such that the blade unit and wiper arm unit are held in a relatively stable or controlled relationship to maintain the longitudinal axis of the blade in a generally parallel relationship to the longitudinal axis of either of the straight portions 18 and 19 of the arm and at the same time maintain the blade unit substantially normal to the surface to be wiped.

The movement-modifying member or arm 3 is preferably made in the form of a rod or wire. The outer end of this member extends between the strap 25 and the base wall 28 of the connection means and has an upturned finger 33 disposed in an aperture provided therefor in the base wall for pivotally connecting the member to the connection means. The inner end of this modifying member is preferably threadedly attached to a coupling 34 which in turn is operatively connected to the end of a support 35 by a screw 36. The support is preferably adjustably secured to a bearing 37 for the drive shaft 7 by a nut 38 so that the point of connection between the modifying member and support may be located in a particular position spaced from the shaft axis. The respective adjustments between the modifying arm 3 and support 35 and between the support and bearing 37, including the extensible features of the wiper arm and the modifying arm 3 afford means whereby the wiper apparatus can be readily modified to meet different installation requirements.

Before describing the operation of the particular apparatus exemplified, it is considered desirable to point out that the blade is directed back and forth across the windshield to constitute one movement; that the blade is moved longitudinally of the arm to constitute a second movement; that the transverse pivot 30 permits the blade to pivot in a conventional manner about the axis of the pivot to constitute a third movement; and that the connection means and novel means on the arm coact to produce a tilting of the blade about its longitudinal axis to constitute a fourth movement; and pivoting of the blade with respect to the longitudinal axis of the arm to constitute a fifth movement. It is to be understood that these movements are applicable only to the preferred embodiment of the invention illustrated in the drawings. It will also be understood that in the apparatus shown the fourth and fifth movements are simultaneous to effect the pivotal and tilting desired, but if found desirable the apparatus can be constructed for use with a windshield in which the fifth movement is not required.

The operation of the apparatus embodying the invention will now be described. Referring to FIGURES 9 and 10 of the drawing, the windshield includes a frontal portion or area 39 and a wing portion or area 40. The windshield is shaded to illustrate the portions not wiped by the blade unit and the unshaded portion is the area or areas which are wiped and constitute the pattern developed or produced by the apparatus. The blade is shown in three different positions in order to promote a better understanding of the invention. When the blade is directed across the windshield to the left in a counterclockwise direction from position A to B the blade will progressively move outwardly along the wiper arm, and when it is returned in a clockwise direction from position B to position A the blade will progressively move inwardly. This inward and outward or reciprocal movement of the blade is due to the modifying arm 3. The straight portion of part 18 of the wiper arm bar 10 may be angled as desired but as shown serves to cause the blade to park in a desirable position in relatively close parallel relationship to the lower part of the windshield frame as shown in FIGURE 10 and at the same time assist in causing the blade to wipe the frontal portion or area of the windshield substantially between positions A and C. In other words, the straight portion 18 of the bar is seated in the openings 32 of the connection means for guidance while the blade moves from position A to position C or in the vicinity of position C. Position C is more or less at the junction between the frontal and wing areas of the windshield. It is to be understood that portion 18 of the wiper arm may be longer or shorter than shown and may be curved or disposed at a different angle or plane with reference to portion 17, depending on the character of the windshield to be cleaned.

When the blade is directed to the left and substantially reaches the position C, the inclined part or portion 19 of the wiper arm will begin to move into the guide openings 32 of the connection means and thereby cause the blade unit to progressively pivot or swing and assume a greater angular relationship with respect to the longitudinal axis of the wiper arm and also progressively tilt the blade by a sort of camming action to maintain the blade normal or erect with respect to the windshield as it travels from position C to B on the wing portion as illustrated in FIGURES 10 and 12. With this novel arrangement the pivotal and/or tilting movement of the blade corresponds to the character of the novel means on the wiper arm to condition the blade for surface conformance.

It will be obvious that the motions or movements just described will be reversed during the return stroke of the blade from position B to A; that the part 19 will continuously coact with the connection means to produce a tilting and pivoting of the blade whenever it is within its oscillating range on the wing portion substantially between its furthermost position B and the intermediate position C; and that the portion 18 will continuously coact with the connection means only during the range substantially between A and C.

As previously alluded to above, the invention offers means whereby the blade reaches out and around the upper area or areas of the wing and this is preferably accomplished by imparting a combination of reciprocal, pivotal and tilting motions to the blade unit as it is directed back and forth across the surface or areas to be cleaned. This conformation of the blade to a windshield of variable contours or compound curves and/or relatively flat portions promotes safety through proper vision. The structure above described is directed to wiper apparatus for the left side of the windshield as viewed in FIGURES 9 and 10 but it should be obvious that the innvention can be used wherever applicable, including the right side of the windshield.

It is to be understood that if found desirable the shape, size and location of the parts 17, 18 and 19 and the connection means may be varied to meet different installation requirements. For example, the parts 18 and 19 may be integral with portion 17 or be separate components attached thereto by rivets or welding, and that part 19 may be curved in lieu of being straight or inclined to a greater or lesser extent than illustrated. Furthermore, the connection between the arm member 10 and connection means may be reversed so that, for example, the member is provided with a slot or means for receiving one or more parts on the connection means to produce the tilting or tilting-and-pivotal actions desired. It should also be manifest that the connection means may be made more in the shape of a housing and that the connection means can be made from a suitable plastic or phenolic. It should be further apparent that the connection and/or the novel means 5 on the wiper arm can be protected by a suitable cover or shroud.

Having thus described my invention, it is obvious that various modifications may be made in the same without departing from the spirit of the invention; and, therefore, I do not wish to understand as limiting myself to the exact form, construction, arrangement and combination of parts herein shown and described.

I claim:

1. In combination: a windshield wiper arm having an inner section and an extensible section, a wiper blade, a connector operatively connecting the extensible section and wiper blade, means on the connector and means on the extensible section adapted to cooperate with one another to cause the means on the connector to pivot and to tilt the blade with respect to the wiper arm upon relative movement therebetween, and means for moving the blade outwardly relative to the extensible section.

2. In combination: a windshield wiper arm, a wiper blade, a connector operatively connecting the wiper arm and wiper blade, means on the connector and means on the wiper arm adapted to cooperate with one another to pivot and to tilt the blade with respect to the wiper arm upon relative movement therebetween, and means for bodily moving the blade with respect to the wiper arm.

3. In combination: a windshield wiper arm provided with cooperating means, a wiper blade, a connector operatively connecting the wiper arm and wiper blade, means on the connector adapted to engage the cooperating means on the wiper arm, and means for moving the blade lengthwise of the arm to cause the means on the connector and the means on the arm to engage one another in a manner whereby to pivot and to tilt the blade with respect to the arm.

4. In combination: a windshield wiper arm provided with cooperating means, a wiper blade, a connector embracing the wiper arm and operatively connecting the wiper arm and wiper blade, means on the connector adapted to engage the cooperating means on the wiper arm to pivot and to tilt the blade with respect to the wiper arm upon relative movement therebetween, and means for reciprocating the blade lengthwise of the arm to cause the means on the connector and the means on the arm to engage one another during such reciprocation.

5. Apparatus for wiping a curved windshield comprising a wiper arm provided with cam means, a wiper blade, and connection means carried by said blade having a guide receiving the arm and engageable with the cam means, means to move the connector lengthwise of the arm in engagement with the cam means in a manner to simultaneously pivot and tilt the blade relative to the arm.

6. In combination: a windshield provided with a curved portion, a drive shaft adjacent said portion, a fitting adjacent said shaft, a wiper arm connected to the shaft and provided with cooperating means, a wiper blade, a connector connecting the blade and arm, said connector having means for engaging the cooperating means on the arm, and means connecting the connector and said fitting effective upon operation of the arm to cause the blade to move axially of the arm and to cause the blade to pivot and to tilt with respect to the arm.

7. In combination: a windshield provided with a frontal portion and a wing portion, a drive shaft located adjacent the junction between said portions of the windshield, a wiper arm connected to the shaft and provided with cam means, a wiper blade, a connector carried by the blade and having guide means slidably receiving the arm and adapted to intermittently engage the cam means thereon, and means connected with the connector effective upon movement of the arm to move the blade axially of the arm and upon further movement of the arm to cause the connector to engage the cam means to pivot and to tilt the blade with respect to the arm.

8. In combination: a windshield provided with a pair of different portions to be wiped, a drive shaft located adjacent to said portions, a wiper arm connected to the shaft and provided with cooperating means including cam means, a wiper blade, a connector carried by the blade and connected to the arm, said connector having means for engaging the cooperating means on the arm, and means connected with the connector effective upon movement of the arm to move the blade axially of the arm and upon further movement of the arm to cause the connector to engage the cam means thereby pivoting and tilting the blade with respect to the arm.

9. Apparatus for wiping a curved windshield comprising a wiper arm provided with an angularly disposed inclined part, a wiper blade, and connection means on the blade having a guide receiving the arm and engageable with the inclined part, means to move the connector lengthwise of the arm in engagement with the inclined part in a manner to simultaneously pivot and to tilt the blade relative to the arm.

10. A windshield wiper assembly comprising a blade having means formed to provide a transverse seat, a tubular bearing secured in the seat, connection means having legs straddling the ends of the bearing, a pivot extending through the bearing and said legs for pivotally connecting the connection means to the blade, and said connection means also having guide means thereon located in spaced relation to the pivot for slidably receiving a straight portion and a shaped portion of a wiper arm, and means effective upon movement of the arm to move the connector longitudinally along the straight portion of the arm, and effective upon further movement of the arm to move the connector along the shaped portion of the arm to pivot and to tilt the blade relative to the arm.

11. In combination: a windshield provided with a frontal portion and a wing portion, a drive shaft located adjacent the junction between said portions of the windshield, a wiper arm connected to the shaft and provided with cooperating means including a relatively straight section and a curved section, a wiper blade, a connector connecting the blade and arm, said connector having means adapted to slidably engage the cooperating means on the arm, and means attached to the connector and to a location adjacent the drive shaft effective upon oscillation of the arm in a first range to cause reciprocation of the connector and blade with respect to the arm along the straight section, and effective upon oscillation of the arm in a second range to cause reciprocation, pivoting, and tilting of the blade with respect to the curved section of the arm upon relative movement therebetween.

12. A windshield wiper assembly comprising a blade having a transverse seat, a tubular bearing secured on the seat, connection means having legs straddling the ends of the bearing, a pivot extending through the bearing and said legs for pivotally connecting the connection means to the blade, said connection means also having guide means thereon located in spaced relation to the pivot for slidably receiving an outer section of a wiper arm, said section of the arm having at least two portions lying in the same plane with the longitudinal axis of one portion disposed at an angle with respect to the longitudinal axis of the other portion, and a third portion of the outer section of the arm lying in a plane disposed at an angle with respect to the plane of the first two mentioned portions, and means effective upon operation of the wiper arm causing sliding movement between the outer section of the wiper arm with the connection means on the blade for relative pivoting and tilting of the blade with respect to the arm.

References Cited in the file of this patent

UNITED STATES PATENTS

| | | |
|---|---|---|
| 2,079,399 | Drew et al. | May 4, 1937 |
| 2,156,505 | Marcolivio | May 2, 1939 |
| 2,236,813 | Evans | Apr. 1, 1941 |
| 2,260,903 | Horton | Oct. 28, 1941 |
| 2,313,203 | Marais | Mar. 9, 1943 |
| 2,345,294 | Schauffler et al. | Mar. 28, 1944 |
| 2,393,194 | Sacchini | Jan. 15, 1946 |
| 2,548,090 | Anderson | Apr. 10, 1951 |

FOREIGN PATENTS

| | | |
|---|---|---|
| 1,032,359 | France | Mar. 25, 1953 |